(12) United States Patent
Keranen et al.

(10) Patent No.: US 9,869,810 B2
(45) Date of Patent: Jan. 16, 2018

(54) METHOD FOR MANUFACTURING ELECTRONIC PRODUCTS, RELATED ARRANGEMENT AND PRODUCT

(71) Applicant: TactoTek Oy, Oulunsalo (FI)

(72) Inventors: Antti Keranen, Kempele (FI); Jarmo Saaski, Kempele (FI); Tuomas Heikkila, Oulu (FI); Paavo Niskala, Oulu (FI); Kari Severinkangas, Oulu (FI); Sami Torvinen, Oulu (FI)

(73) Assignee: TACTOTEK OY, Oulunsalo (FI)

( * ) Notice: Subject to any disclaimer, the term of this patent is extended or adjusted under 35 U.S.C. 154(b) by 63 days.

(21) Appl. No.: 14/264,273

(22) Filed: Apr. 29, 2014

(65) Prior Publication Data
US 2015/0308639 A1    Oct. 29, 2015

(51) Int. Cl.
*F21V 1/00*  (2006.01)
*F21V 8/00*  (2006.01)

(52) U.S. Cl.
CPC ........... *G02B 6/0065* (2013.01); *G02B 6/006* (2013.01); *G02B 6/0091* (2013.01); *G02B 6/0036* (2013.01); *G02B 6/0051* (2013.01)

(58) Field of Classification Search
CPC ....... F21K 9/90; G02B 6/0031; G02B 6/0055; G02B 6/73; G02B 6/0043
USPC .......................................... 362/235; 156/280
See application file for complete search history.

(56) References Cited

U.S. PATENT DOCUMENTS

| | | | |
|---|---|---|---|
| 5,484,292 A * | 1/1996 | McTaggart | B42C 9/00 345/901 |
| 6,672,738 B1 * | 1/2004 | Lewis et al. | 362/249.12 |
| 8,234,804 B1 * | 8/2012 | Rush | 40/546 |
| 2004/0125592 A1 * | 7/2004 | Nagakubo | G02B 6/0036 362/619 |

(Continued)

FOREIGN PATENT DOCUMENTS

EP    2228258    9/2010

OTHER PUBLICATIONS

Praseeda Shirodkar, The advantages and disadvantages of thermoforming, Mar. 12, 2016 (last updated), Buzzle.*

(Continued)

*Primary Examiner* — Bao Q Truong
*Assistant Examiner* — Matthew Peerce
(74) *Attorney, Agent, or Firm* — Robert P. Michal, Esq.; Carter, DeLuca, Farrell & Schmidt, LLP

(57) ABSTRACT

A method for manufacturing an electronic product, includes: obtaining a flexible, optically substantially transparent or translucent, substrate sheet; printing a number of electrical conductors on the substrate sheet in accordance with a predefined schematic; printing or disposing a number of electronic components including optoelectronic light emissive, preferably LED (light-emitting diode), components on the substrate sheet in accordance with the schematic, wherein at least some of the printed conductors are configured to provide electrical current thereto; and attaching a flexible, optically substantially transparent, lightguide sheet to the substrate so as to establish a functional multi-layer structure, where the light emitted by the light emissive components is incoupled to the lightguide, propagates there- (Continued)

Figure 1:
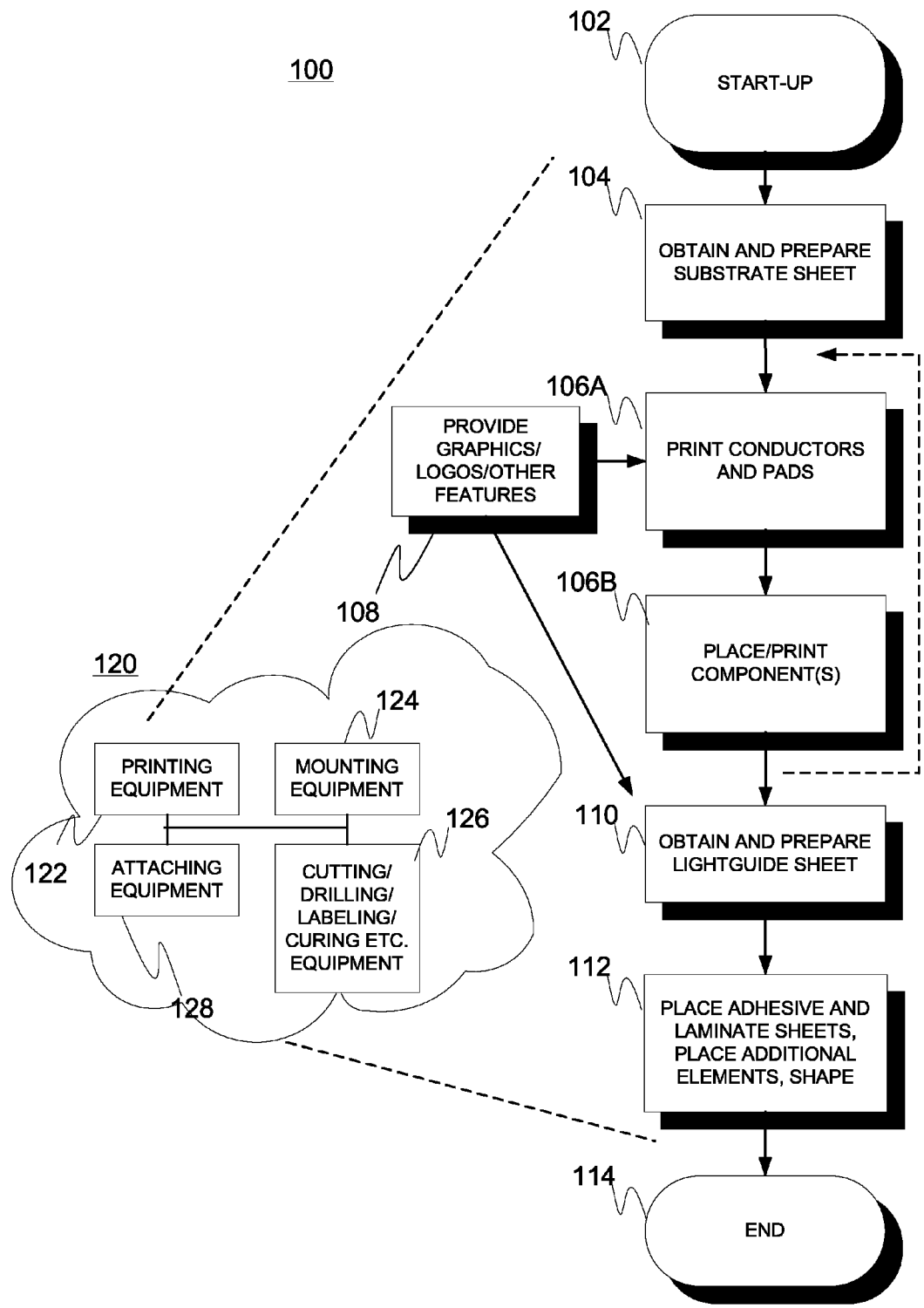

within, and is at least partly outcoupled to the environment through the substrate sheet. Related arrangement and electronic device are presented.

23 Claims, 2 Drawing Sheets

(56) References Cited

U.S. PATENT DOCUMENTS

| | | | | |
|---|---|---|---|---|
| 2005/0265029 | A1* | 12/2005 | Epstein | G02B 3/0056 362/339 |
| 2006/0240260 | A1* | 10/2006 | Heino | C23C 14/0605 428/408 |
| 2009/0262411 | A1* | 10/2009 | Karmhag | A42B 3/226 359/265 |
| 2009/0296389 | A1* | 12/2009 | Hsu | G02F 1/133603 362/235 |
| 2010/0283718 | A1* | 11/2010 | Choi et al. | 345/102 |
| 2011/0198026 | A1* | 8/2011 | Gourlay | G02B 6/0021 156/280 |
| 2011/0198117 | A1* | 8/2011 | Watanabe et al. | 174/268 |
| 2011/0317417 | A1* | 12/2011 | Gourlay | G02B 6/0043 362/235 |
| 2012/0139843 | A1* | 6/2012 | Shipman et al. | 345/170 |
| 2012/0268963 | A1* | 10/2012 | Gourlay | G02B 6/0021 362/602 |
| 2013/0033901 | A1* | 2/2013 | Nishitani | G02B 6/0036 362/613 |
| 2013/0335963 | A1* | 12/2013 | Chen | 362/235 |
| 2014/0146543 | A1* | 5/2014 | Ben Levy | 362/311.01 |
| 2014/0301073 | A1* | 10/2014 | Miskin | 362/235 |
| 2015/0092429 | A1* | 4/2015 | Speer et al. | 362/418 |

OTHER PUBLICATIONS

Norland Products, NOA 81.*
International Search Report PCT/FI2015/050261 dated Aug. 10, 2015.
Written Opinion of the International Searching Authority PCT/FI2015/050261 dated Aug. 10, 2015.

* cited by examiner

METHOD FOR MANUFACTURING ELECTRONIC PRODUCTS, RELATED ARRANGEMENT AND PRODUCT

FIELD OF THE INVENTION

Generally the present invention concerns manufacturing processes in the context of electronic products and related products. Particularly, however not exclusively, the invention pertains to manufacturing processes involving printed electronics and optoelectronic components.

BACKGROUND

Miniaturization is a prevalent trend in the manufacturing of electronic products. Additionally, manufacturing costs should be kept minimum, which implies relatively straight-forward, high yield processes with reduced number of process stages and material waste among other factors.

Although more traditional electronic elements such as PCBs (printed circuit board), conductors, components like SMDs (surface-mount device), etc. have reduced in size and weight, many of them are still relatively bulky and rigid/inflexible compared to printed electronics. Printed electronics have generally shown the way to thin, light, flexible/bendable and rapidly manufactured structures.

Current optical or optoelectronic solutions generally follow the aforementioned trends. Control of light emission, transmission, coupling, etc. is increasingly required in a variety of different applications ranging from mobile electronics and digital entertainment to digital signage and automotive industry. Traditionally, the control of light transmission has required the use of relatively complex coupling and filtering structures, which have been, besides tricky to manufacture with good yield, space-consuming, fragile, lossy and costly.

Accordingly, in many occasions it could be sensible to utilize opportunities provided by printed electronics or combine several manufacturing technologies including printed electronics to obtain products with desired characteristics, yield and cost. In a multitude of contemporary optical applications, the size, cost, and reliability requirements are rather strict considering e.g. the manufacturing of small-sized, consumer electronics grade touch panels embedded in various apparatuses such as smartphones, tablets, and phablets. While the theory in the field of physics and optics leading at a sufficient level of light control in such applications is well known for years by now, many manufactured solutions have fallen under a number of aforesaid pitfalls such as complexity and fragility.

SUMMARY OF THE INVENTION

The objective of the embodiments of the present invention is to at least alleviate one or more of the aforesaid drawbacks evident in the prior art arrangements in the context of manufacturing of electronic products incorporating flexible substrates, conductors and optoelectronic components.

The objective is generally achieved with a method of manufacture and an electronic product obtained therewith.

In one aspect, a method for manufacturing an electronic product, comprising:

obtaining a flexible, optically substantially transparent or translucent, substrate sheet, printing a number of electrical conductors on the substrate sheet in accordance with a predefined schematic, printing or disposing a number of electronic components including optoelectronic light emissive, optionally LED, components on the substrate sheet in accordance with the schematic, wherein at least some of the printed conductors are configured to provide electrical current thereto, and attaching a flexible, optically substantially transparent, lightguide sheet to the substrate so as to establish a functional multi-layer structure, where, in use, the light emitted by the light emissive components is incoupled to the lightguide, propagates therewithin, and is at least partly outcoupled to the environment through the substrate sheet.

Optionally, the lightguide sheet may be provided, using cutting or drilling equipment, for example, with a number of recesses, flutes, grooves, bevels, and/or holes, such as through-holes, for accommodating and embedding at least part of the optoelectronic components.

In another aspect, a manufacturing arrangement for an electronic product or device, comprises equipment configured to print a number of electrical conductors on a flexible, optically substantially transparent or translucent, substrate sheet, in accordance with a predefined schematic, provide a number of electronic components including optoelectronic light emissive, optionally LED, components on the substrate sheet in accordance with the schematic, wherein at least some of the printed conductors are configured to provide electrical current thereto, and attach a flexible, optically substantially transparent, lightguide sheet with the substrate so as to establish a functional multi-layer laminate structure, where, in use, the light emitted by the light emissive components is incoupled to the lightguide, propagates therewithin, and is at least partly outcoupled to the environment through the substrate sheet.

Optionally, the printing equipment of the arrangement comprises a printing apparatus such as a screen printing or ink jetting apparatus to print the conductors, i.e. conductive traces of conductive ink, on the substrate.

In certain embodiments, at least some of the components including optoelectronic components like LEDs may be printed utilizing the same or additional printing gear as used for printing the conductors. Alternatively or additionally, mounting equipment, optionally pick and place machine, may be utilized to place and align electronic surface-mountable components including aforementioned optoelectronic components on the substrate.

Attaching equipment of the arrangement may include e.g. a glue dispensing apparatus to provide adhesive layer or adhesive dot(s) to secure the lightguide sheet to the substrate. The adhesive may be initially provided on the substrate sheet and/or lightguide sheet. Optionally, the lightguide sheet may be established upon attaching, e.g. by a moulding apparatus included in the attaching equipment. For example, the substrate sheet provided with components may be overmoulded so as to at least partly encapsulate it in the molded material, preferably plastics.

Yet, the arrangement may comprise a number of additional elements such as drying/heating/curing equipment, cutter, carving or drilling equipment, etc. One or more elements of the arrangement may be optionally integrated together. For example, printing equipment or mounting equipment may also be configured to provide adhesive. In extreme case, the arrangement is implemented by equipment that could be considered as a single apparatus.

In a further aspect, an electronic product, or device, comprises an optically functional multi-layer structure incorporating a flexible, optically substantially transparent or translucent, substrate sheet, provided with a number of electrical conductors printed thereon, a number of electronic components including optoelectronic light emissive, optionally LED, components arranged on the substrate sheet, wherein at least some of the printed conductors are configured to provide electrical current thereto, and a flexible, optically substantially transparent, lightguide sheet attached to the substrate preferably via adhesive layer or adhesive dots, configured such that, in use, the light emitted by the light emissive components is incoupled to the lightguide, propagates therewithin, and is at least partly outcoupled to the environment through the substrate sheet.

In some embodiments, the electronic device may be or constitute at least part of a mobile communications device such as a smartphone, tablet, phablet, a gaming accessory such as game controller, UI (user interface) device, a computer, a desktop computer, laptop computer, industrial apparatus, display device, lighting device, a power tool, an automobile, vehicle, automotive display device, wearable electronics, wristop device, or a smart goggles or other smart (digital) headwear.

The device may be either substantially planar or three-dimensional. In the latter case, initially optionally planar substrate film may have been provided with components and bent to a target 3d-shape prior to or upon provision of the lightguide sheet thereon.

The various embodiments of the method disclosed herein may be flexibly applied to the arrangement and product mutatis mutandis and vice versa, as being readily understood by a person skilled in the art.

The utility of the embodiments of the present invention results from multiple different issues. The obtained electronic product is robust, compact, thin as well as preferably flexible or bendable, and optically at least sufficiently efficient to serve the various intended use scenarios wherein light transmission between light sources such as LEDs and target locations or areas is required for illumination and/or aesthetic purposes. The manufacturing costs remain low and the used materials, components, and equipment, and related pieces, are easily obtainable. The method may be implemented using relatively standard equipment and is scalable from prototyping to mass production.

Yet, different informative and/or aesthetic visual indications, e.g. graphics, may be illuminated or rendered visually distinguishable by the suggested light source-embedding laminate structure, while the indications themselves may be cleverly exploited to outcouple light from within the lightguide.

The expression "a number of" may herein refer to any positive integer starting from one (1).

The expression "a plurality of" may refer to any positive integer starting from two (2), respectively.

Different embodiments of the present invention are also disclosed in the attached dependent claims.

BRIEF DESCRIPTION OF THE RELATED DRAWINGS

Next, the embodiments of the present invention are more closely reviewed with reference to the attached drawings, wherein FIG. 1 is a flow diagram disclosing an embodiment of a method in accordance with the present invention.

Figure 2:
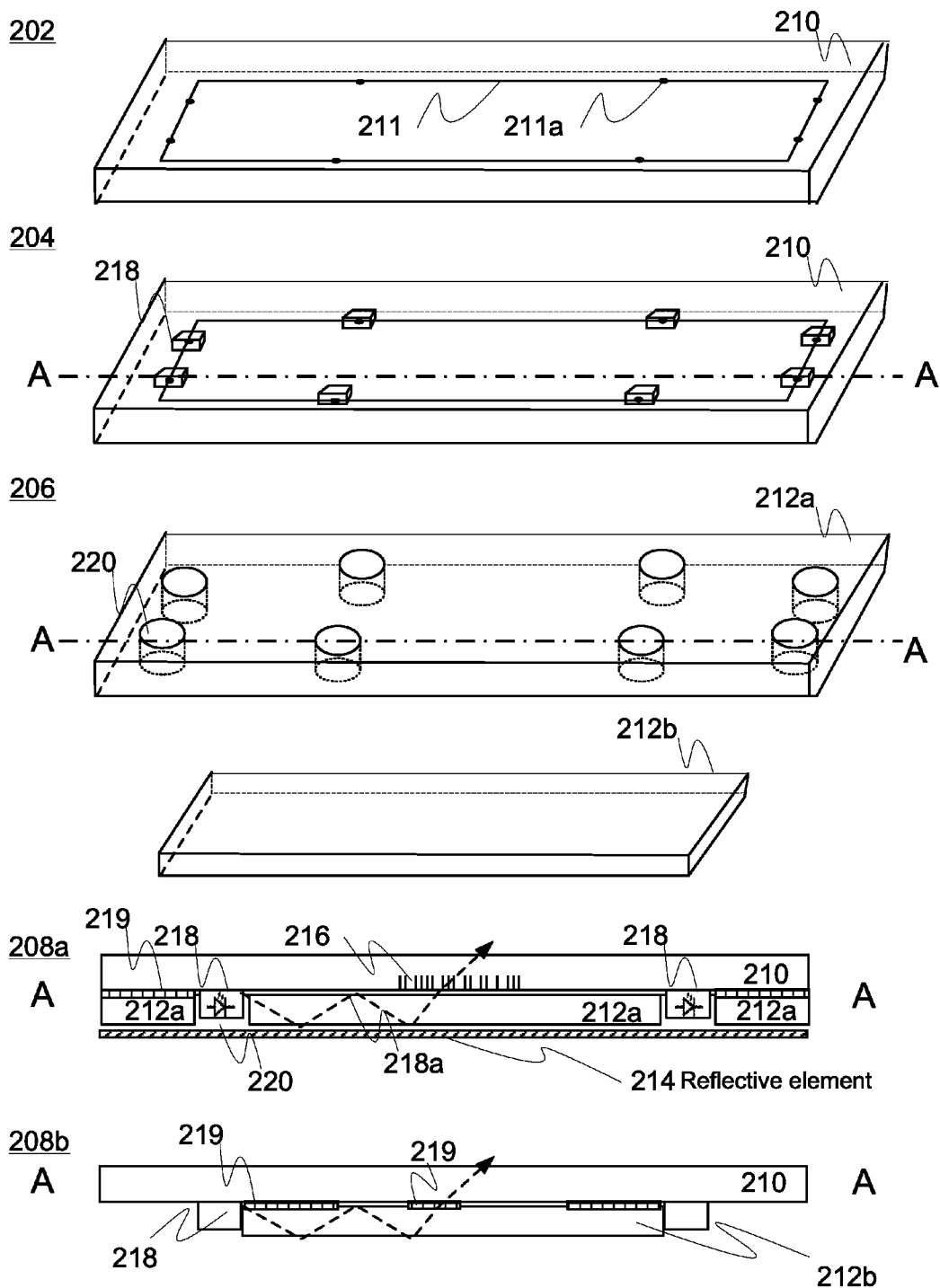

FIG. 2 illustrates the overall concept of the present invention via an embodiment thereof.

DETAILED DESCRIPTION

With reference to FIG. 1, a flow diagram of one feasible embodiment for manufacturing an electronic product, or device, in accordance with the present invention is shown.

At 102, referring to a start-up phase, the necessary preparatory actions such as material, element and tools general selection, acquisition, configuration and material pre-processing may take place. Circuit layout may be defined in the light of product specification and other constraints. Process parameters may be tested, tweaked and optimized.

For example, the used ink(s) shall be preferably selected in connection with the available printing/disposition technique and the substrate material because different printing techniques require different rheological properties from the used ink, for instance. Further, different printing technologies provide varying amounts of ink per time unit, which often affects the achievable conductivity figures.

At 104, a substrate sheet is obtained and optionally pre-processed. A sheet with predefined, desired dimensions may be cut from a larger piece. Alternatively, e.g. roll-to-roll processing may be applied.

The sheet preferably comprises or consists of plastic. It may be a flexible plastic film, for instance. At least initially it may be substantially flat. The substrate may comprise at least one material selected from the group consisting of: plastic, polyethylene terephthalate (PET), polycarbonate (PC), acrylonitrile-butadiene-styrene (ABS), Glycolized polyethylene terephthalate (PETG), high impact polystyrene (HIPS), high-density polyethylene (HDPE), and acrylic polymer.

Optionally, as indicated by item 108, the substrate sheet may be provided with features for controlling light coupling (in- and/or outcoupling) or transmission. The features may include surface relief forms that can be manufactured through embossing or stamping, for example. The features may include printed graphics, e.g. logo(s) visible from outside the substrate. Optionally, in-mold decoration or labelling may be utilized to produce such.

Thickness of the substrate may vary according to properties required from the film, such as material strength, flexibility, elasticity, transparency (measured e.g. via haze and luminous transmittance) and/or size required from the final product. The thickness of the substrate may be selected depending on the embodiment. It may be a tenth or few tenths of a millimeter only, or more, several millimeters, for example.

At 106A, electrical wiring, or conductors, is provided on the substrate. Preferably the conductors are printed by a printing method falling under the category of printed electronics. For example, screen, ink jet, flexo(graphy), gravure, rotary, tampo, or offset printing may be utilized.

Preparation of printing equipment, which may be done at 106A or during start-up 102, may incorporate various phases. For instance, in connection with screen printing, first a number of film positives may be created in accordance with the desired circuit layout to be manufactured. Then the screen(s) are provided with the film image(s) using suitable exposure procedure etc., after which the hardened screen(s) are provided to the printing machine or 'press'.

The conductors following a predefined schematic (i.e. layout/plan/diagram regarding the circuits, their positioning and connections) for transmitting power/current and e.g. data signals to/from or between the components on the substrate, may incorporate or be substantially formed of conductive traces of one or more conductive inks. The ink(s) may be non-adhesive or adhesive. Adhesive properties may not be needed from the ink, and in some embodiments, not even desired as they typically introduce problems in terms of durability and controllability.

In addition to conductors or traces considered as conductors, conductive contact areas, or 'contact pads', for the contacts (leads, pins, pads, etc.) of electronic components, such as surface-mountable components, may be formed on the substrate. The areas may be integral with the conductors. The areas may be formed by the conductive ink by printing, as well.

The conductor areas and component contact areas, or 'pads', may optionally differ from each other in terms of ink constitution, ink layer thickness, dimensions, etc. It shall be noted, however, that the predefined (schema-following) contact areas do not have to necessarily differ from the conductor areas, regarding e.g. shape or used ink, and these two may appear substantially the same, i.e. uniform or homogenous, at least locally on the substrate.

Examples of commonly available conductive inks include e.g. DuPont 5000™ and Asahi SW1600C™. In some embodiments, it may be preferred that the inks used are passive in contrast to e.g. many conductive adhesives, and bear rheological properties, e.g. viscosity or surface tension, which enable sufficient flow during ejection or squeezing, i.e. ink dispensing/printing, but prevent the ink from spreading too easily into adjacent materials and structures afterwards. Yet, drying characteristics may be optimized. The preferred sheet resistivity of the printed ink may be about 80 mOhm/sq (at about 10 um print thickness) or less, for example, more advantageously about 50 mOhm/sq or less.

Preferably, the conductive ink is selected such that it withstands the necessary amount of strain like stretching so that the traces produced retain their conductivity and potential other desirable properties under stress. The substrate may be subjected to stress during the manufacturing process of the electronic product (considering e.g. (substrate) shaping) or later during the use thereof.

The conductive ink may contain conductive particles such as nanoparticles. The particles may be metal particles such as metal nanoparticles, but alternatively or additionally, conductive polymer ink may be utilized.

The ink may include silver, gold, copper or carbon as a conductive material, for example. Transparent ink may be used in applications wherein e.g. the material moulded over the substrate/component(s) is transparent or translucent and the underlying conductive traces should not be clearly visible.

As a further example, PTF such as silver-based PTF (Polymer Thick Film) paste type ink could be utilized for (screen) printing the desired circuit design on the film. Also e.g. copper or carbon-based PTF pastes could be used.

Optionally, a plurality of conductive inks may be utilized. For instance, one or more inks may be utilized for printing all or selected conductors whereas one or more other inks may be utilized for printing at least some of the conductive mount locations (contact areas).

At 106B, a number of electronic components such as at least one optoelectronic, light (i.e. preferably visible, but additionally or alternatively non-visible electromagnetic radiation depending on the use scenario) emissive component, preferably LED (light-emitting diode), are arranged onto the substrate. The components may be surface-mountable, e.g. surface-mountable ICs (integrated circuit), and/or printed using the same or other printing equipment as used for providing the conductors. Also hybrid components are feasible, considering e.g. flip chips that are surface mounted.

The LED(s) may be OLED(s) (Organic LED), for instance.

The LED(s) may be side emitting or 'side shooting' (also called as sideLEDs), for example.

Yet, the LED(s) may be provided as SMD (surface-mount device) packages and/or as lead-based.

The LED package may be of predefined color. Accordingly, the resin transporting and emitting the generated light may be colorless/clear or colored. Accordingly, it may be optically substantially clear or diffusing.

The electrical contacts of the provided component(s) shall meet the predefined contact areas on the substrate to establish the desired electrical connection therebetween.

Additionally, physical binding between the substrate and the component(s) may be strengthened or accomplished through the use of adhesive. The adhesive may be single-part surface mount epoxy, for instance. Alternatively or additionally, multi-component adhesive may be utilized. The utilized conductive ink may be adhesive as mentioned hereinearlier.

Optionally, at least some and/or portion of the components may be embedded within the substrate, i.e. beneath the surface of the substrate.

At 110, a lightguide sheet is obtained. The sheet may be cut from a bigger piece or e.g. roll-to-roll method may be applied. The lightguide sheet may comprise at least one material selected from the group consisting of: plastic, polycarbonate (PC), polyethylene terephthalate (PET), polymethyl methacrylate (PMMA), polyamide (PA), cyclo olefin copolymer (COC), cyclo olefin polymer (COP), polytetrafluoroethylene (PTFE), and polyvinyl chloride (PVC). Its thickness may be some tenths of a millimeter or less, for instance.

Preferably, the lightguide sheet is of optically substantially transparent or at least, translucent material. The haze and luminous transmittance of various materials may be utilized as a guideline for selecting lightguide material with desired optical characteristics.

The lightguide sheet may be provided with a number of recesses, grooves, or holes, optionally through-holes, for accommodating at least part of one or more components such as aforementioned optoelectronic components. Mechanical punching, drilling or e.g. precision laser drilling may be utilized for the purpose. Alternatively, the lightguide sheet may be molded so as to contain the desired recesses or holes.

Optionally, as indicated by item 108, the lightguide sheet may be particularly provided with features for controlling light coupling (in- and/or outcoupling) or transmission. The features may include surface relief forms that can be manufactured through embossing or stamping, for example. The features may include printed graphics, e.g. logo(s) visible from outside the product. Optionally, in-mold decoration or labelling may be utilized to produce such.

At 112, the lightguide sheet is arranged onto the substrate sheet as properly positioned. For instance, the holes, if any, of the sheet shall match the location of the light-emissive components so that the components will fit the holes nicely and when in use, the light emitted therefrom is coupled to the lightguide with desired efficiency and e.g. incident angles.

Adhesive layer or dots may be provided between the substrate and lightguide sheets. Adhesive may be first dispensed to either or both the sheets at selected portions (e.g.

edge portions and/or areas near light-emissive components), whereupon the sheets are brought together to form a multi-layer laminate structure with embedded components and conductors. In addition to adhesive, suitable temperature and/or pressure for enhancing the bond may be utilized.

In an alternative scenario, the lightguide could be formed and attached by molding the associated material onto the substrate at this stage.

Optionally, the holes are filled with suitable material such as resin/adhesive with applicable optical, hardening, adhesive and/or protective properties.

The multi-layer structure may be provided with additional elements such as a reflective sheet for preventing light leakage via the lightguide side facing the opposite direction from the substrate. Alternatively, such element could be provided to the lightguide sheet prior to attaching to the substrate.

In some embodiments, the multi-layer structure may be subjected to shaping by thermoforming, for instance, to exhibit a desired three-dimensional shape.

The obtained structure may be used to establish an illumination arrangement for a host device, for example. Alternatively, it may be configured to establish a UI or generally a sensing structure and comprise, in addition to light emitter(s), also detector(s) for capturing externally received or internally propagated light.

At 114, method execution is ended. The potentially iterative nature of method items is indicated in the figure by the dotted loop-back arrow.

At 120, high-level block diagram of an embodiment of an arrangement for executing the method is shown.

Printing equipment 122 such as at least one automated printing press or ink jet printer is utilized for printing the conductors ("wires") and/or components such as (O)LEDs. Mounting equipment 124 including e.g. a pick and place machine may be utilized for providing electronic components, such as integrated circuits, SMDs such as SMD LEDSs, lead-based LEDs, etc. onto the substrate and optionally lightguide. Instead of or in addition to mounting equipment 124, printing equipment 122 or further printing equipment, may be exploited for printing components directly onto the substrate and optionally lightguide.

Attaching equipment 128 integrates the substrate and lightguide sheets together. The attaching equipment 128 may include e.g. glue dispensing, lamination, and/or moulding machine(s).

Item 126 refers to potential further elements that may be found in the arrangement depending on the embodiment thereof. Drilling machine, cutter, labeling device, curing equipment (e.g. reflow oven), etc. may be applied.

In FIG. 2, the overall concept of the present invention is further reviewed by an embodiment thereof.

At 202, a substrate sheet 210, which may be a single layer or multi-layer substrate, is shown with conductors 211 provided thereon. Yet, contact areas, or 'pads', 211a may be provided on the substrate for receiving contact elements of circuit components, such as SMDs/ICs or individual components, provided thereon.

In some embodiments, the substrate 210 (and optionally lightguide 212a, 212b) may be thermoformable and thus be optionally thermoformed (either prior to or upon/after integration) to produce desired shapes therein.

At 204, the substrate 210 further comprises the components 218, such as optoelectronic components like LEDs, disposed and/or printed thereon. The electrical contact pads or other corresponding features of the components 218 shall match the target contact areas on the substrate 210, optionally formed by the conductors 211 as explained hereinbefore.

Regarding the disposed components, adhesive such as surface mount glue may be applied to secure the at least one component physically to the substrate. Further, glop-topping or generally different suitable packaging technologies such as coatings or potting could be selectively exploited to protect and/or secure the components.

The electrical and/or physical bond between the substrate and the component may be secured by means of drying, heating and/or curing using e.g. an oven suitable for the purpose, such as a reflow oven.

At 206, two embodiments 212a, 212b of lightguide sheet are illustrated.

The first embodiment 212a comprises a lightguide dimensioned so as to cover, or in practice surround, when properly attached to the substrate, components 218. For accommodating the components 218, holes 220 such as through-holes or recesses matching with the component layout may be established in the lightguide material using e.g. suitable drilling means as discussed hereinbefore.

The second embodiment 212b comprises a lightguide sheet dimensioned so as to substantially fit within the component 218, layout, or 'component 218 circle'/'PLED circle', i.e. be adjacent to the components in the center area of the substrate but not covering them, thereby lacking need to provide them with holes to embed the associated LEDs 218, etc.

At 208a, one embodiment with integrated substrate 210 and lightguide 212a sheets is shown via a cross-section sketch along line A-A. Adhesive 219 is used for attaching the sheets 210, 212a. Light 218a emitted by optoelectronic components 218, such as LEDs, is incoupled to the lightguide 212a, propagating therein preferably substantially by total internal reflection until outcoupling via the surface facing the substrate 210 towards the environment after passing through the substrate 210. Outcoupling may be optionally controlled or enhanced by placing e.g. adhesive and/or other outcoupling-affecting elements, e.g. printed graphics 216 potentially obtained through in-mold labelling or decoration, at the desired locations on the substrate/lightguide interface or within the layers 210, 212a.

The graphics 216 is thus preferably utilized, besides their visual decorative and/or informative function, utilized for controlling light coupling. The material of the graphics may, for example, have refractive index selected such, relative to the lightguide 212b and/or substrate 210 materials, that light outcoupling occurs at desired locations and angles. Accordingly, the graphics 216, e.g. contours and/or inner portions thereof, may be illuminated and thus visual effect created for better visibility of the graphics, for instance.

Generally, the graphics 216, such as provided ink, may be substantially optically transparent, translucent or opaque.

Optionally, a reflective element 214, such as diffuser or (specular reflection) mirror, may be provided to prevent excessive light leakage through the opposite, or 'bottom', surface of the lightguide 212a. The element 214 may be laminated with the lightguide 212a.

At 208b, another embodiment incorporating lightguide 212b is correspondingly represented. The lightguide 212b lacks recesses/holes of components 218 such as LEDs as it is fitted within region spanned by the components 218 at the periphery thereof, i.e. 'LED circle'. Adhesive areas 219 in connection/adjacent to the components 219 or remotely located therefrom, e.g. in the center portion of the lightguide 212b or substrate 210, may be utilized to control light coupling such as incoupling from the components 218 to the lightguide 212b and/or outcoupling therefrom towards the environment and potential user(s) via the substrate 210.

Although not explicitly illustrated for clarity reasons, reflective element 214 could also be present in the embodiment at 208b. Yet, the embodiment at 208a could include adhesive portions utilized for controlling light coupling in addition to fixing/attachment purposes.

As being evident based on the above embodiments, the adhesive layer 219 may define an adhesive frame substantially surrounding components such as LEDs 218 near the lightguide 212a, 212b or substrate 210 edges. Adhesive 219 may be disposed to selected places to enhance or generally control incoupling, transmission, and/or outcoupling of light relative to the lightguide sheet 212a, 212b.

The shapes and dimensions of the elements such as substrate 210 and lightguide 212a, 212b may be determined on embodiment-basis. In some embodiments, the lightguide 212a, 212b and substrate sheets 210 may be rectangular, square or round in shape, for example.

The scope of the invention is determined by the attached claims together with the equivalents thereof. The skilled persons will again appreciate the fact that the disclosed embodiments were constructed for illustrative purposes only, and the innovative fulcrum reviewed herein will cover further embodiments, embodiment combinations, variations and equivalents that better suit each particular use case of the invention.

The invention claimed is:

1. A method for manufacturing an electronic product, comprising:
    obtaining a flexible, optically substantially transparent or translucent, substrate sheet;
    printing, by an additive printed electronics process, a plurality of electrical conductors on the substrate sheet;
    printing or disposing a plurality of electronic components including optoelectronic light emissive components on the substrate sheet, at least some of the printed conductors being configured to provide electrical current thereto; and
    attaching a flexible, optically substantially transparent, lightguide sheet to the substrate sheet to establish a multi-layer structure, the light emitted by the light emissive components being received by the lightguide sheet, propagating therewithin, and then being at least partly emitted to the environment through the substrate sheet,
    wherein the light emitted by the light emissive components is contained entirely within the lightguide sheet by total internal reflection until being at least partly emitted to the environment by outcoupling via the outcoupling-affecting element, and
    wherein the outcoupling-affecting element comprises an adhesive.

2. The method of claim 1, further comprising thermoforming the multi-layer structure to a desired substantially 3-D shape.

3. The method of claim 1, further comprising thermoforming one or more of the substrate sheet and the lightguide sheet to a desired substantially 3-D shape prior to the attaching.

4. The method of claim 1, wherein the attaching incorporates utilization of an adhesive layer, adhesive areas or adhesive dots between the substrate sheet and lightguide sheet, the utilized adhesive being optically substantially transparent or at least translucent.

5. The method of claim 1, wherein the plurality of optoelectronic, light emissive components include at least one side emitting light-emitting diode (LED).

6. The method of claim 1, wherein the lightguide sheet is provided with a plurality of recesses or through-holes to accommodate one or more of the optoelectronic components.

7. The method of claim 1, wherein the substrate sheet or lightguide sheet is provided with a visible and visually distinguishable feature to control emitted light and to be illuminated by the light.

8. The method of claim 6, wherein the substrate sheet or lightguide sheet is provided with a visible and visually distinguishable feature to control emitted light and be illuminated by the light, and
    wherein in-mold labelling or decoration is utilized to produce the visible and visually distinguishable feature underneath the outer surface of a material molded on the substrate sheet.

9. The method of claim 1, wherein a reflective element is provided substantially adjacent to the lightguide sheet to reflect light leaked therefrom back towards the lightguide sheet.

10. The method of claim 1, wherein a reflective element is provided substantially adjacent to the lightguide sheet to reflect light leaked therefrom back towards the lightguide sheet, and
    wherein the reflective element is substantially a mirror to trigger specular reflection of incident light.

11. The method of claim 1, wherein a reflective element is provided substantially adjacent to the lightguide sheet to reflect light leaked therefrom back towards the lightguide sheet, and
    wherein the reflective element is substantially a diffuser to scatter the incident light.

12. The method of claim 4, wherein the adhesive layer, area or dot is configured to control or enhance emission of light from the lightguide sheet substantially at lightguide sheet locations adjacent thereto.

13. The method of claim 1, wherein the substrate sheet comprises at least one material selected from the group consisting of:
    plastic, polyethylene terephthalate (PET), polycarbonate (PC), acrylonitrilebutadiene-styrene (ABS), Glycolized polyethylene terephthalate (PETG), high impact polystyrene (HIPS), high-density polyethylene (HDPE), and acrylic polymer.

14. The method of claim 1, wherein the lightguide sheet comprises at least one material selected from the group consisting of:
    plastic, polycarbonate (PC), polyethylene terephthalate (PET), polymethyl methacrylate (PMMA), polyamide (PA), cyclo olefin copolymer (COC), cyclo olefin polymer (COP), polytetrafluoroethylene (PTFE), and polyvinyl chloride (PVC).

15. The method of claim 1, wherein the thickness of the substrate sheet is a millimeter or less.

16. The method of claim 1, wherein the thickness of the lightguide sheet is less than about 0.5 mm.

17. The method of claim 1, wherein the attaching includes laminating by adhesive, pressure and/or heat.

18. The method of claim 1, wherein the attaching includes molding.

19. The method of claim 1, wherein electrically conductive ink is utilized for the printing.

20. A manufacturing system for an electronic product or device, the manufacturing system comprising:

equipment configured to:
- print, by an additive printed electronics process, a plurality of electrical conductors on a flexible, optically substantially transparent or translucent substrate sheet according to a predefined layout,
- provide a plurality of electronic components including optoelectronic light emissive components on the substrate sheet according to the predefined layout, at least some of the printed conductors being configured to provide electrical current thereto, and
- attach a flexible, optically substantially transparent, pre-prepared lightguide sheet with the substrate sheet to establish a functional multi-layer laminate structure in which the light emitted by the light emissive components is received by the lightguide sheet, propagating therewithin, and then being at least partly emitted to the environment through the same substrate sheet on which the light emissive components are provided, wherein the light emitted by the light emissive components is contained entirely within the lightguide sheet by total internal reflection until being at least partly emitted to the environment by outcoupling via an outcoupling-affecting element, and wherein the outcoupling-affecting element comprises an adhesive.

21. An electronic system comprising:
an optically functional multi-layer structure incorporating:
- a flexible, optically substantially transparent or translucent, substrate sheet, provided with a plurality of electrical conductors printed thereon,
- a plurality of electronic components including optoelectronic light emissive components arranged on the substrate sheet, at least some of the printed conductors being configured to provide electrical current thereto, and
- a flexible, optically substantially transparent, pre-prepared lightguide sheet attached to the substrate sheet and configured such that the light emitted by the light emissive components is received by the lightguide sheet, propagating therewithin, and being at least partly emitted to the environment through the same substrate sheet on which the light emissive components are provided; and additive printed electronics equipment configured to print the electrical conductors on the flexible, optically substantially transparent or translucent, substrate sheet, wherein the light emitted by the light emissive components is contained entirely within the lightguide sheet by total internal reflection until being at least partly emitted to the environment by outcoupling via an outcoupling-affecting element, and wherein the outcoupling-affecting element comprises an adhesive.

22. The method of claim 1, wherein the lightguide sheet is a single layer pre-prepared lightguide sheet.

23. The method of claim 2, wherein the plurality of electronic components are printed or disposed on the substrate sheet prior to the thermoforming.

* * * * *